(12) United States Patent
Yokokawa et al.

(10) Patent No.: US 11,167,554 B2
(45) Date of Patent: Nov. 9, 2021

(54) LIQUID ABSORBER, LIQUID ABSORBING UNIT, AND LIQUID EJECTION APPARATUS

(71) Applicant: SEIKO EPSON CORPORATION, Tokyo (JP)

(72) Inventors: Shinobu Yokokawa, Nagano (JP); Shogo Nakada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/817,731

(22) Filed: Mar. 13, 2020

(65) Prior Publication Data

US 2020/0290358 A1 Sep. 17, 2020

(30) Foreign Application Priority Data

Mar. 15, 2019 (JP) .............................. JP2019-048868
Nov. 27, 2019 (JP) .............................. JP2019-214040

(51) Int. Cl.
*B41J 2/165* (2006.01)

(52) U.S. Cl.
CPC ................................ *B41J 2/16517* (2013.01)

(58) Field of Classification Search
CPC ......................... B41J 2/16517; B01J 20/28028
See application file for complete search history.

(56) References Cited

U.S. PATENT DOCUMENTS

| | | | | |
|---|---|---|---|---|
| 3,232,916 A | * | 2/1966 | Fogle | C08L 29/04 525/56 |
| 5,789,076 A | * | 8/1998 | Isohata | B01J 20/28033 428/315.9 |
| 2014/0127510 A1 | * | 5/2014 | Handa | A61L 15/48 428/402 |
| 2014/0184694 A1 | | 7/2014 | Takano et al. | |
| 2017/0119226 A1 | | 5/2017 | Nakayama et al. | |
| 2019/0224644 A1 | | 7/2019 | Ikemoto et al. | |
| 2020/0164653 A1 | * | 5/2020 | Miyasaka | B41J 2/16508 |
| 2020/0298572 A1 | * | 9/2020 | Nakada | B41J 2/16517 |

FOREIGN PATENT DOCUMENTS

| | | | | |
|---|---|---|---|---|
| CA | 2067391 A1 | | 2/1992 | |
| CN | 103895355 A | | 7/2014 | |
| CN | 106661787 A | | 5/2017 | |
| JP | 2001163901 A | * | 6/2001 | ................ C08F 2/24 |
| WO | 2018/008758 A1 | | 1/2018 | |

* cited by examiner

*Primary Examiner* — Sharon Polk
(74) *Attorney, Agent, or Firm* — Global IP Counselors, LLP (57) ABSTRACT

A liquid absorber includes a plurality of small chips. Individual ones of the small chips include a first substrate containing fibers, a second substrate containing fibers, and an absorbent resin supported between the first substrate and the second substrate. The first substrate contains an ion scavenger.

8 Claims, 5 Drawing Sheets

LIQUID ABSORBER, LIQUID ABSORBING UNIT, AND LIQUID EJECTION APPARATUS

The present application is based on, and claims priority from JP Application Serial Number 2019-048868, filed Mar. 15, 2019 and JP Application Serial Number 2019-214040, filed Nov. 27, 2019, the disclosures of which are hereby incorporated by reference herein in their entirety.

BACKGROUND

1. Technical Field

The present disclosure relates to a liquid absorber, a liquid absorbing unit, and a liquid ejection apparatus.

2. Related Art

In general, ink jet printers discharge waste ink when cleaning the head to prevent ink clogging that is a cause of degradation of printing quality, and when filling the head with ink for changing ink cartridges. To absorb such waste ink, a liquid absorbing unit including a liquid absorber is used.

For example, International Publication No. 2018/008758 discloses an absorbent composite containing a N-vinyl lactam-based crosslinked polymer and a base material with a specific mass ratio. According to this publication, the absorbent composite is expected to be used as an excellent ink absorbent agent.

The above-cited publication describes a fact that the crosslinked structure of the N-vinyl lactam-based crosslinked polymer causes the polymer to absorb water and other solvents to swell and gel. However, this polymer is nonionic and is, therefore, not necessarily so absorbent of aqueous liquid as superabsorbent polymer (SAP), such as polyacrylic acids, having an anionic group in the main chain thereof.

Although polyacrylic acids and other absorbent resins or polymers having an anionic group are absorbent of aqueous liquid, the absorption speed or the absorbency of such resins is reduced when the resin absorbs water or an aqueous solution containing ions in a large proportion. Thus, when an anionic absorbent resin is used to absorb, for example, a dye ink containing a high concentration of electrolyte, the absorbency of the resin is not always as high as expected.

SUMMARY

Accordingly, the present disclosure provides a liquid absorber that is highly absorbent of dye inks in spite of using an anionic absorbent resin and also provides a liquid absorbing unit and a liquid ejection apparatus that use the liquid absorber.

A liquid absorber according to an aspect of the present disclosure includes a plurality of small chips. Individual ones of the small chips include a first substrate containing fibers, a second substrate containing fibers, and an absorbent resin supported between the first substrate and the second substrate. The first substrate contains an ion scavenger.

In an embodiment of the liquid absorber, the proportion by mass of the ion scavenger may be 0.25 part to 30.0 parts relative to 100 parts of the first substrate.

In an embodiment of the liquid absorber, the ion scavenger may be selected from the group consisting of polyvinylpyrrolidone, polyvinyl alcohols, polyethylene glycols, polysaccharides, pectin, guar gum, zwitterionic polymers, ion exchange resins, and modified polymers thereof; zeolite, montmorillonite, bentonite, clay, and active carbon; and mixtures thereof.

In an embodiment of the liquid absorber, the ion scavenger may be a polyvinylpyrrolidone having a weight average molecular weight of 9000 to 2800000.

In an embodiment of the liquid absorber, the ion scavenger may be a polyvinyl alcohol having a saponification degree of 38.0% to 99.0%, and a solution of 4.0% by mass of the polyvinyl alcohol in water has a viscosity of 4.5 mPa·s to 122.0 mPa·s at 20° C.

In an embodiment of the liquid absorber, the ion scavenger may be a modified polyvinyl alcohol, and the modified polyvinyl alcohol content in the first substrate is 0.25 part to 20.0 parts by mass relative to 100.0 parts by mass of the first substrate.

In an embodiment of the liquid absorber, the ion scavenger may be chemically bound to the fibers with a crosslinking agent.

According to another aspect of the present disclosure, a liquid absorbing unit is provided. The liquid absorbing unit includes the liquid absorber and a container containing the liquid absorber.

The present disclosure is also directed to a liquid ejection apparatus including a liquid ejection head operable to eject a liquid, and the liquid absorbing unit. The liquid absorbing unit is operable to absorb the liquid.

DESCRIPTION OF EXEMPLARY EMBODIMENTS

Some of the embodiments of the present disclosure will now be described. The following embodiments describe some implementations of the present disclosure. The implementation of the subject matter of the disclosure is not limited to the following embodiments, and various modifications may be made within the scope and spirit of the disclosure. Not all of the components disclosed in the following embodiments are necessarily essential for the subject matter disclosed herein.

1. Liquid Absorber

A liquid absorber 100 according to an embodiment of the present disclosure includes a plurality of small chips 10.

1.1. Small Chips

The small chips 10 of the liquid absorber 100 each absorb liquid. Since the chips 10 absorb liquid, the liquid absorber 100, which is a mass of the chips 10, functions to absorb liquid.

Figure 1:
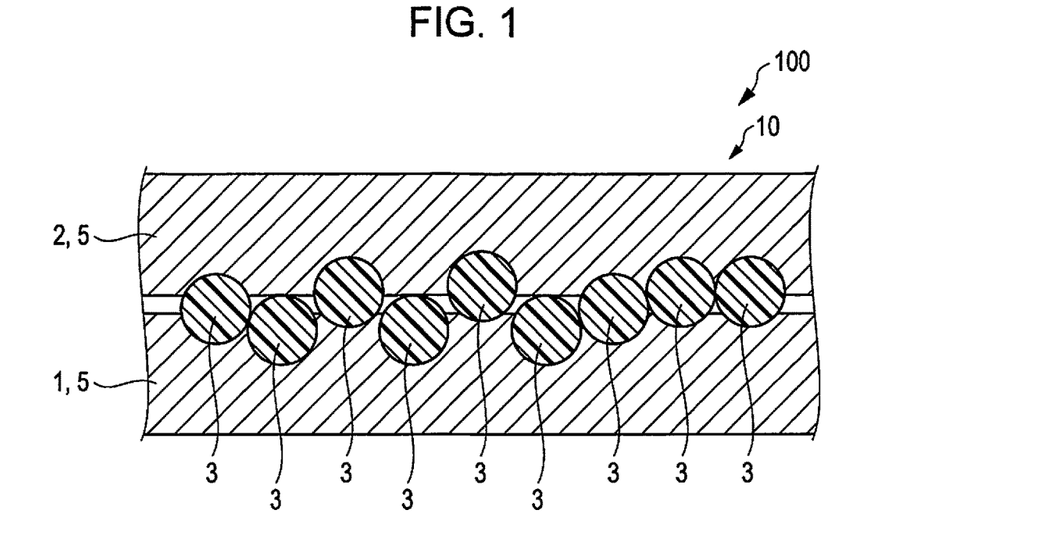
FIG. 1 is a schematic sectional view of one of small chips defining a liquid absorber according to an embodiment of the present disclosure.

FIG. 1 is a schematic sectional view of one of the chips 10 of the liquid absorber 100 of the present embodiment. The chip 10 includes a first substrate 1, a second substrate 2, and an absorbent resin 3.

1.1.1. Substrate

The first substrate 1 and the second substrate 2 are in the form of a sheet. The first substrate 1 and the second substrate 2 contain fibers. The material of fibers may be, for example, a synthetic resin, such as polyester or polyamide, or a natural fiber, such as cellulose, keratin, or fibroin.

In some embodiments, the fibers contained in the first substrate 1 and the second substrate 2 are of cellulose. Since cellulose fiber material is hydrophilic, the cellulose fibers in the substrates easily mix with and retain the liquid applied to the chip 10, thus bringing the liquid into contact with the absorbent resin 3.

Also, since cellulose fiber material has an affinity to the absorbent resin 3, the fibers in the substrates easily support the absorbent resin at the surfaces thereof. In addition, since cellulose fiber material is a natural material capable of being recycled and is one of the fiber materials available at low cost, use of cellulose fiber is beneficial for manufacturing cost reduction, consistent manufacture, and environmental load reduction. The cellulose fibers used herein are fibers containing cellulose as a major component and may further contain hemicellulose and/or lignin.

The average length of the fibers may be 0.1 mm to 7.0 mm, for example, 0.1 mm to 5.0 mm or 0.1 mm to 3.0 mm. The average width of the fibers may be 0.5 μm to 200.0 μm, for example, 1.0 μm to 100.0 μm. The average aspect ratio, that is, the ratio of the average length to the average width, of the fibers may be from 10 to 1000, for example, from 15 to 500. Fibers having such dimensions are more beneficial for helping the substrates to support the absorbent resin 3, retaining liquid, and bringing the absorbent resin 3 into contact with the liquid, thus increasing the liquid absorbency of the chips 10.

At least one of the first substrate 1 and the second substrate 2 contains an ion scavenger. The ion scavenger may be contained both the first substrate 1 and the second substrate 2.

1.1.2. Ion Scavenger

The ion scavenger may be selected from among polymers that do not release ions when coming into contact with water (such polymers hereinafter referred to as nonionic polymers), ion exchange resins, polymers modified from such polymers or resins, inorganic adsorbent materials, such as zeolite, montmorillonite, bentonite, clay, and active carbon, and mixtures thereof.

1.1.2.1. Nonionic Polymer

Nonionic polymers do not release hydrogen ions, metal ions, ammonium ions, hydroxide ions, or the like when coming into contact with water.

The nonionic polymer is soluble in water and is thus hydrophilic. Examples of the nonionic polymer include polyvinylpyrrolidone (PVP), polyvinyl alcohols (PVA), vinyl acetate-vinyl acetate copolymers, polyethylene glycol (PEG), betaine polymer (zwitterionic polymer), polysaccharides, such as guar gum and pectin, polymers having a structure of such nonionic polymers in the main chain or a side chain, and mixtures of two or more of those polymers. The nonionic polymer may be modified by being bound to, for example, a silanol group, a hydroxy group, or a group that becomes reactive when heated. The nonionic polymer may have a crosslinked structure.

More specifically, examples of the PVP nonionic polymers include PITZCOL series produced by DKS. Examples of the PVA nonionic polymers include GOHSENOL series produced by Mitsubishi Chemical, DENKA POVAL series produced by Denka, and KURARAY POVAL series produced by LURARAY. A polysaccharide nonionic polymer is available as tamarind seed gum from Mitsubishi-Chemical Foods. Examples of the betaine polymer include RAM Resin Series (carboxybetaine polymer (methacryloyl ethyl betaine/acrylates copolymer) produced by Osaka Organic Chemical Industry. Kuraray Silanol-Modified POVAL series produced by Kuraray are silanol-modified polyvinyl alcohols and are examples of the modified polymers.

It is beneficial that the nonionic polymer do not change into a solution when coming into contact with water or an organic solvent. As the molecular weight of a nonionic polymer is increased, the solubility of the nonionic polymer in water or an organic solvent decreases. Also, the solubility of the nonionic polymer is reduced by introducing crosslinks to the polymer. Nonionic polymers having a high molecular weight or containing crosslinks are likely to swell or gel when coming into contact with water or organic solvents. Thus, the solubility of the nonionic polymer can be controlled by varying the molecular weight or the degree of crosslinking. If the nonionic polymer is made insoluble in water or organic solvents, the nonionic polymer becomes likely to be retained between the fibers and kept in the substrate(s) even though the chips 10 come into contact with a liquid.

The nonionic polymer absorbs the water and organic solvent in the liquid applied to the chips 10. When the liquid is an ink, the nonionic polymer also adsorbs the coloring material of the ink. Particularly when the liquid is a dye ink, the nonionic polymer adsorbs the dye of the ink and thus traps the dye. The nonionic polymer is compatible with dyes. By adding a nonionic polymer into the fibers in the substrate, which have a large surface area, the probability of the nonionic polymer to come into contact with the dye is increased.

1.1.2.2. Ion Exchange Resin

Ion exchange resins include cation exchange resins capable of trapping cations and anion exchange resins capable of trapping anions.

A cation exchange resin functions to trap cations from a liquid and releases hydrogen ions. For example, a cation exchange resin in contact with an aqueous solution traps cations from the solution and releases an amount of hydrogen ions equivalent to the amount of the trapped cations. The released hydrogen ions cause a neutralization reaction with hydroxide ions in the solution to produce water. Such a cation exchange resin may be referred to as an "H-form type" in some cases.

Thus, such a cation exchange resin can be used to remove cations, such as metal ions and ammonium ions.

Cation exchange resins can be classified into two types depending on the acidity of the functional group of the resin: one is the type of strongly acidic cation exchange resins; and the other is the type of weakly acidic cation exchange resins. In the embodiments of the present disclosure, either type may be used. In some embodiments, a strongly acidic cation exchange resin may be used in view of cation exchanging efficiency.

The cation exchange resin used herein may be in the form of a porous solid or a gel. Gel-type cation exchange resins are more versatile and less expensive than the porous solid type. The cation exchange resin may be in the form of scaly particles, needle-like particles, fibers, spherical particles, or particles having any other shape. In some embodiments, spherical particles may account for the majority of the cation exchange resin. Spherical particles of the cation exchange resin are likely to help the fibers in the first substrate 1 and the second substrate 2 to support the absorbent resin 3.

The cation exchange resin used herein may satisfy $0.15 \leq L/D \leq 467$, for example, $0.25 \leq L/D \leq 333$ or $2 \leq L/D \leq 200$, wherein D represents the average particle size of the cation exchange resin particles and L represents the average length of the fibers in the first substrate 1 and the second substrate 2. The average particle size of the cation exchange resin may be adjusted by a known pulverization or grinding method if necessary.

The resin content in the chips 10 may be, by mass, 0.01 part to 100.0 parts, for example, 0.25 part to 30.0 parts, relative to 100.0 parts of the substrates. Thus, the chips 10 ensure sufficient absorption and penetration of dye inks.

The cation exchange resin is commercially available, and examples thereof include IXE-100 and some other IXE series produced by Toagosei; Amberlite series IR120B, IR124, FPC3500, and IPC76 and Amberlyst series 15DRY, 15JWET, 16WET, 31WET, and 35WET, all available from Organo; gel-type DIAION series (H-form type) SK104 and SK1B and porous DIAION series (H-form type) PK212, PK216, and PK228, all produced by Mitsubishi Chemical; Solid Super Strong Acid (sulfated zirconia ($SO_4/ZrO_2$)) produced by FUJIFILM Wako Pure Chemical Corporation; and Carbon Type Solid Acid Catalyst produced by GS Alliance.

An anion exchange resin functions to trap anions from a liquid and release hydroxide ions. For example, an anion exchange resin in contact with an aqueous solution traps anions from the solution and releases an amount of hydroxide ions equivalent to the amount of the trapped anions. The released hydroxide ions cause a neutralization reaction with hydrogen ions in the solution to produce water. Such an anion exchange resin may be referred to as an "OH-form type" in some cases.

Such an anion exchange resin can be used to remove anions having a relatively low molecular weight, for examples, anions produced by ionization of acetic acid, sulfuric acid, sodium chloride, or the like, or anions having a relatively high molecular weight, for example, anions produced by ionization of dye, protein, nucleic acid, or the like.

Anion exchange resins can be classified into two types depending on the basicity of the functional group of the resin: one is the type of strongly basic anion exchange resins; and the other is the type of weakly basic anion exchange resins. The anion exchange resin used herein may be in the form of a porous solid or a gel. Gel-type anion exchange resins are more versatile and less expensive than the porous solid type. The anion exchange resin may be in the form of scaly particles, needle-like particles, fibers, spherical particles, or particles having any other shape. In some embodiments, spherical particles may account for the majority of the anion exchange resin. Spherical particles are more favorably supported by the fibers in the substrate.

The anion exchange resin used herein may satisfy $0.15 \leq L/D \leq 467$, for example, $0.25 \leq L/D \leq 333$ or $2 \leq L/D \leq 200$, wherein D represents the average particle size of the anion exchange resin particles and L represents the average length of the fibers in the first substrate 1 and the second substrate 2. The average particle size of the anion exchange resin may be adjusted by a known pulverization or grinding method if necessary.

The anion exchange resin is commercially available, and examples thereof include IXE-500, IXE-530, IXE-550, IXE-700F, IXE-700D, IXE-800, and some other IXE series produced by Toagosei; Amberlite series IRA400J OH, IRA402BL OH, IRA404J OH, IRA900J OH, IRA904 OH, IRA458RF OH, IRA958 OH, and IRA900J OH, all available from Organo; and gel-type DIAION SA10A (Type I, OH-form type) produced by Mitsubishi Chemical.

The ion exchange resin used herein may be in the form of, for example, scaly particles, needle-like particles, fibers, spherical particles, or particles having any other shape. In some embodiments, spherical particles account for the majority of the ion exchange resin. Ion exchange resins in the form of spherical particles allow easy water permeation. In addition, spherical particles are more likely to be supported by the fibers in the first substrate 1 and/or the second substrate 2. The term "spherical particles" used herein refers to particles of which the aspect ratio (ratio of the smallest length to the largest length) is in the range of 0.3 to 1.0. The average particle size of the ion exchange resin particles may be 0.15 μm to 800.0 μm, for example, 15.0 μm to 400.0 μm or 15.0 μm to 50.0 μm.

The particle size may be represented by a mean volume diameter (MVD) measured by, for example, a laser diffraction particle size distribution analyzer, which is a particle size distribution analyzer based on a laser diffraction/scattering method and can measure particle size distribution on a volume basis.

1.1.2.3. Inorganic Adsorbent Material

Inorganic adsorbent materials have a relatively large surface area, and such a material may be a porous inorganic polymer or a layer compound. Inorganic adsorbent materials can act as an ion scavenger to trap at least either cations or anions.

Examples of such inorganic adsorbent materials include porous aluminosilicates, such as zeolite; phyllosilicates (sheet clay minerals), such as montmorillonite, bentonite, smectite, and clay; and active carbon. In some embodiments, an inorganic adsorbent material may be selected from among zeolite, montmorillonite, bentonite, clay, and active carbon. The inorganic adsorbent material used herein is in the same form as the particles of the ion exchange resin.

1.1.3. Supported State of Ion Scavenger

The ion scavenger contained in at least one of the first substrate 1 and the second substrate 2 may be in the form of either spherical particles or sheet-like particles or both. It will now be described how the ion scavenger is present in at least one of the first substrate 1 and the second substrate 2. In the following description, the at least one substrate containing the ion scavenger is simply referred to as the substrate.

The substrate contains fibers, and the ion scavenger may be present in the substrate in a state where the ion scavenger is caught on or covers the fibers. Alternatively, the ion scavenger may be in a state chemically bound to the fibers by a reaction of the functional group of the ion scavenger with the functional group of the fiber material. For example, in an embodiment in which an ion scavenger having a silanol group is contained in a substrate containing cellulose fibers, the ion scavenger may be present in the substrate in a state chemically bound to the fibers by a reaction between the silanol group of the ion scavenger and the hydroxy group of the cellulose.

Also, the fiber material and the ion scavenger may be chemically bound to each other with a crosslinking agent. Such an ion scavenger is unlikely to separate or fall from the fibers. For example, in an embodiment in which an ion scavenger having a hydroxy group is contained in a substrate containing cellulose fibers, the ion scavenger in the substrate may be chemically bound to the fibers by crosslinking the hydroxy group of the ion scavenger to the hydroxy group of the cellulose with a crosslinking agent.

The crosslinking agent used for binding the ion scavenger to the fibers can be selected according to the functional group of the ion scavenger and the functional group of the fiber material. The crosslinking agent may be, for example, a blocked polyisocyanate, a diisocyanate, or a silane coupling agent.

The blocked polyisocyanate has two or more isocyanate groups in the molecule and is not otherwise limited. The main skeleton of the blocked polyisocyanate may be an aromatic polyisocyanate, an alicyclic polyisocyanate, or an aliphatic polyisocyanate. In some embodiments, an alicyclic polyisocyanate or an aliphatic polyisocyanate may be used because of resistance to yellowing.

Examples of the aromatic polyisocyanate include aromatic diisocyanates, such as 2,4-tolylene diisocyanate, 2,6-tolylene diisocyanate, mixtures thereof (TDI), diphenylmethane 4,4'-diisocyanate (MDI), naphthalene 1,5-diisocyanate, 3,3-dimethyl-4,4-biphenylene diisocyanate, crude tolylene diisocyanate (crude TDI), polymethylenepolyphenylene diisocyanate, crude diphenylmethane diisocyanate (crude MDI), phenylene diisocyanate, and xylylene diisocyanate.

Examples of the alicyclic polyisocyanate include 1,3-cyclopentane diisocyanate, 1,3-cyclopentene diisocyanate, and cyclohexane diisocyanate.

Examples of the aliphatic polyisocyanate include trimethylene diisocyanate, 1,2-propylene diisocyanate, butylene diisocyanate, pentamethylene diisocyanate, and hexamethylene diisocyanate.

Polyisocyanate derivatives that can be the main skeleton of the blocked polyisocyanate include monomers (for example, dimers, trimers, pentamers, and heptamers) of the above-cited polyisocyanates and compounds produced by a reaction of one or more polyisocyanates with an active hydrogen-containing organic compound. Such compounds include allophanate-modified compounds produced by, for example, a reaction of a polyisocyanate with an alcohol, polyol-modified compounds, such as an alcohol adduct, produced by, for example, a reaction of a polyisocyanate with an alcohol, biuret-modified compounds produced by, for example, a reaction of a polyisocyanate with water or an amine, urea-modified compounds produced by, for example, a reaction of a polyisocyanate with a diamine, oxadiazinetrione-modified compounds produced by, for example, a reaction of a polyisocyanate with carbon dioxide, carbodiimide-modified compounds produced by decarboxylation condensation of a polyisocyanate, and uretdione-modified compounds, and uretonimine-modified compounds.

More specific examples of the blocked polyisocyanate include Meikanate CX, Meikanate SU-268A, and Meikanate TP-10 (all produced by Meisei Chemical Works); ELASTRON BN-69, ELASTRON BN-77, and ELASTRON BN-27 (all produced by DKS), Aqua BI200 and Aqua BI220 (both produced by Baxenden), and TAKELAC WS series (produced by Mitsui Chemicals).

The ion scavenger content in the substrate may be, by mass, 0.1 part to 30.0 parts, for example, 0.25 part to 30.0 parts, 0.5 part to 20.0 parts, or 5.0 parts to 15.0 parts, relative to 100 parts of the substrate.

In an embodiment using a polyvinylpyrrolidone (PVP) as the ion scavenger, the polyvinylpyrrolidone may have a weight average molecular weight (Mw) of 9000 to 2800000, for example, 45000 to 1200000. The weight average molecular weight can be measured in accordance with a method specified in JIS K 7252-3, Determination of average molecular mass and molecular mass distribution of polymers using size-exclusion chromatography—Part 3: Low-temperature method.

In an embodiment using a polyvinyl alcohol (PVA) as the ion scavenger, the solution of 4.0% by mass of the polyvinyl alcohol in water may have a viscosity of 4.5 mPa·s to 122.0 mPa·s at 20° C., and the saponification degree of the polyvinyl alcohol may be 38.0% to 99.0%. In such an embodiment, the viscosity of the 4.0% by mass PVA aqueous solution at 20° C. may be 48.0 mPa·s to 122.0 mPa·s, and the saponification degree of the polyvinyl alcohol may be 86.5% to 99.0%. The saponification degree of the polyvinyl alcohol can be measured in accordance with a method specified in JIS K 6726-1994, Testing method for polyvinyl alcohol.

In an embodiment using a modified polyvinyl alcohol (silanol-modified polyvinyl alcohol) as the ion scavenger, the content of the modified polyvinyl alcohol in the substrate may be, by mass, 0.25 part to 20.0 parts relative to 100.0 parts of the substrate.

For adding the ion scavenger into the substrate, an aqueous solution or water dispersion of the ion scavenger may be applied to the substrate. In this instance, the aqueous solution or water dispersion of the ion scavenger may be applied by spray coating, using a brush or a roller, an ink jet method, or the like, optionally followed by drying. Furthermore, if necessary, a solution of a crosslinking agent may be applied to the substrate by spray coating, using a brush or a roller, an ink jet method, or the like. The ion scavenger solution or dispersion and the crosslinking agent solution may be applied to the substrate at one time.

The first substrate 1 and the second substrate 2 may further contain any other material in addition to the fibers and the ion scavenger. Such a material may be a binder functioning to bind fibers. Examples of the raw material of the first substrate 1 and the second substrate 2 include paper including recycled waste paper, nonwoven fabric, and a pulp sheet.

The constituents of the first substrate 1 and the second substrate 2, including the material of the ion scavenger, may be the same or different between the substrates. In an embodiment, the first substrate 1 and the second substrate 2 may be formed from a single substrate material folded in two, as will be described later herein. Use of such a substrate material is beneficial for easily forming the small chips 10.

1.1.4. Absorbent Resin

The absorbent resin 3 is present between the first substrate 1 and the second substrate 2. More specifically, the absorbent resin 3 is supported between the first substrate 1 and the second substrate 2. The particles of the absorbent resin 3 may have sticky surfaces, and such a stickiness may cause the first substrate 1 and the second substrate 2 to directly support the absorbent resin 3.

Since the absorbent resin 3 is supported between the first substrate 1 and the second substrate 2, the absorbent resin 3 does not separate or fall easily from the first substrate 1 and the second substrate 2. As depicted in FIG. 1, the particles of the absorbent resin 3 may be partially embedded in the surfaces of the first substrate 1 and the second substrate 2. In other words, the surfaces of the first substrate 1 and the second substrate 2 may be impregnated with part of the absorbent resin 3. Thus, the first substrate 1 and the second substrate 2 can more reliably support the absorbent resin 3.

The absorbent resin 3 may be a superabsorbent polymer (SAP) that can exhibit high water absorption. Water absorption is the process of water molecules being taken in. The absorbent resin 3 may absorb water to swell or gel. More specifically, the absorbent resin 3 absorbs water from an aqueous liquid or a hydrophilic organic solvent or fluid.

Examples of the absorbent resin 3 include carboxymethyl cellulose, polyacrylic acid, polyacrylamide, starch-acrylic acid graft copolymers, hydrolysates of starch-acrylonitrile graft copolymers, vinyl acetate-acrylate copolymers, isobutylene-maleic acid copolymers, hydrolysates of acrylonitrile copolymers or acrylamide copolymers, polyethylene oxide, polysulfone compounds, polyglutamic acid, and salts, modified forms, and crosslinked forms thereof.

The absorbent resin 3 may be a nonionic absorbent resin whose absorbency is less dependent on the electrolyte concentration of the liquid to be absorbed, for example, a crosslinked polyvinylpyrrolidone produced by Nippon Shokubai. However, such a nonionic absorbent resin is expensive, and the amount of liquid absorption per weight thereof is as low as about ⅕ to 1/20 of that of generally used anionic absorbent resins having an acid group. Accordingly, in some embodiments, an anionic absorbent resin may be used, or an anionic absorbent resin may be a major constituent of the absorbent resin.

As just described, a resin having an acid group is beneficial as the absorbent resin 3. The acid group may be the carboxy group, the sulfo group, or the phosphate group. Resins having a carboxy group are easily available and are therefore beneficial.

The carboxy group of such a resin may be present on a side chain of the resin molecule. Resins having a carboxy group on a side chain may be produced from monomer units, such as acrylic acid, methacrylic acid, itaconic acid, maleic acid, crotonic acid, fumaric acid, sorbic acid, cinnamic acid, and anhydrides, salts, and other derivatives thereof. In some embodiments, the absorbent resin 3 may have such a monomer unit.

An absorbent resin 3 having an acid group may be neutralized to form a salt, and the proportion of the acid group in the form of a salt may be, by mole, 30.0% to 100.0%, for example, 50.0% to 95.0%, 60.0% to 90.0%, or 70.0% to 80.0%. Such an absorbent resin 3 exhibits high water absorption. In this instance, the salt formed by the neutralization may be a salt of an alkali metal, such as sodium, potassium, or lithium or a salt of a nitrogen-containing base, such as ammonia. Sodium salts are beneficial.

In some embodiments, the absorbent resin 3 contains a poly(meth)acrylic acid salt copolymer or a crosslinked poly (meth)acrylic acid polymer. In the poly(meth)acrylic acid salt copolymer or the crosslinked poly(meth)acrylic acid polymer, the monomer unit having a carboxy group may account for 50.0% by mole or more of all the structural units of the molecular chain of the polymer. For example, such a monomer unit may account for 80.0% by mole or more or 90.0% by mole or more.

The absorbent resin 3 may be in the form of, for example, scaly particles, needle-like particles, fibers, spherical particles, or particles having any other shape. In some embodiments, spherical particles account for the majority of the absorbent resin 3. An absorbent resin 3 in the form of spherical particles allows easy water permeation. In addition, spherical particles are more likely to be supported by the fibers in the first substrate 1 and the second substrate 2. The term "spherical particles" used herein refers to particles of which the aspect ratio (ratio of the smallest length to the largest length) is in the range of 0.3 to 1.0. The average particles size of the absorbent resin particles may be 1.5 μm to 800.0 μm, for example, 15.0 μm to 400.0 μm or 15.0 μm to 50.0 μm.

The particle size may be represented by a mean volume diameter (MVD) measured by, for example, a laser diffraction particle size distribution analyzer, which is a particle size distribution analyzer based on a laser diffraction/scattering method and can measure particle size distribution on a volume basis.

The absorbent resin 3 may satisfy $0.15 \leq L/D \leq 467.0$, for example, $0.25 \leq L/D \leq 333.0$ or $2 \leq L/D \leq 200.0$, wherein D represents the average particle size of the absorbent resin 3 and L represents the average length of the fibers in the first substrate 1 and the second substrate 2. The average particle size of the absorbent resin 3 may be adjusted by a known pulverization or grinding method if necessary.

The proportion of the absorbent resin 3 content in the small chip 10 may be, by mass, 25.0% to 300.0%, for example, 50.0% to 150.0%, relative to the fiber content. Such chips 10 ensure sufficient liquid absorption and permeation.

Some resins suitable as the absorbent resin 3 of the small chips 10 disclosed herein are commercially available, and examples thereof include AQUALIC CA series and AQUALIC CS series produced by Nippon Shokubai, SANWET series and SANFRESH ST-500MPSA and other SANFRESH series produced by Sanyo Chemical Industries, Hysorb series produced by BASF, FAVOR series produced by Evonik, and AQUASORB series produced by SNF.

1.1.5. Shape of Small Chips

Figure 2:
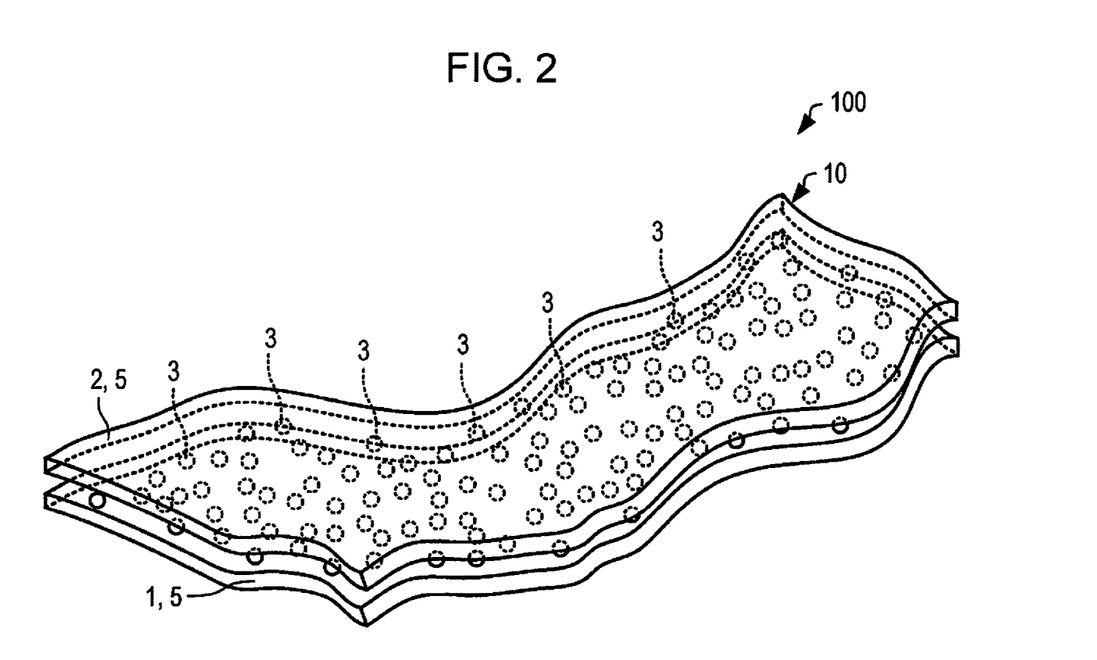
FIG. 2 is a schematic perspective view of one of the small chips of a liquid absorber according to an embodiment of the present disclosure.

FIG. 2 is a schematic perspective view of one of the small chips 10 of the liquid absorber according to an embodiment of the present disclosure. The chips 10 are pieces into which a structure including a sheet member for the first substrate 1 and the second substrate 2 and the absorbent resin 3 supported or held by the sheet member is cut with a shredder or the like. FIG. 1 used for the description above schematically illustrates a part of a chip 10. The chip 10 may be flexible and rectangular. Such a chip 10 can easily change the shape thereof and is accordingly easy to handle, for example, when housed in a container.

The length, or the measurement in the longitudinal direction, of the chip 10 may be 0.5 mm to 200.0 mm, for example, 1.0 mm to 100.0 mm or 2.0 mm to 30.0 mm.

The width, or the measurement along the shorter side, of the chip 10 may be 0.1 mm to 100.0 mm, for example, 0.3 mm to 50.0 mm or 1.0 mm to 10.0 mm.

The aspect ratio, that is, the ratio of the length to the width, of the chip 10 may be from 1 to 200, for example, from 1 to 30. The thickness of the chip 10 may be 0.05 mm to 2.0 mm, for example, 0.1 mm to 1.0 mm.

The chips 10 having such dimensions are more beneficial for supporting the absorbent resin 3, helping the fibers to retain liquid, and bringing the liquid into contact with the absorbent resin 3, thus exhibiting high liquid absorption.

1.1.6. Function and Effect of the Chips

The chips 10 absorb liquid. As described above, the chip 10 disclosed herein includes the absorbent resin 3, and at least one of the first substrate 1 and the second substrate 2 contains an ion scavenger. When the chips 10 come into contact with a liquid, the liquid is absorbed by at least one of the first substrate 1, the second substrate 2, and the absorbent resin 3.

An absorbent resin 3 having an acid group may be degraded in terms of the degree and speed of absorption when the ion concentration in the liquid to be absorbed is increased. For example, when a liquid having a high electrolyte concentration, such as a dye ink, is absorbed, the ions in the liquid hinder the absorbent resin 3 from absorbing the liquid. Therefore, even if the proportion of the absorbent resin 3 in the chips is increased, the liquid absorption is not so increased as the increase of the absorbent resin 3.

At least either of the substrates of the chips 10 contains an ion scavenger. Since the ion scavenger traps ions, ions are not likely to reach the space between the first substrate 1 and the second substrate 2 where the absorbent resin 3 is present. Thus, the decrease in the absorbency of the absorbent resin 3 is suppressed, and the absorbency of the absorbent resin 3 is maintained.

The liquid absorbed by the chips 10 may be, but is not limited to, aqueous liquid. The chips 10 are absorbent even of liquid with a high electrolyte concentration because of the above-described structure. Accordingly, the chips 10 are particularly effective in absorbing liquid with a high ion concentration, such as a dye ink.

In general, inks are classified into three types: pigment inks, dye inks, and mixtures thereof. The coloring materials contained in different types of ink are different, and pigment inks have a low electrolyte concentration, while dye inks have a high electrolyte concentration. Accordingly, anionic absorbent resins are more absorbent of pigment inks but less absorbent of dye inks.

1.2. Liquid Absorber

Figure 3:
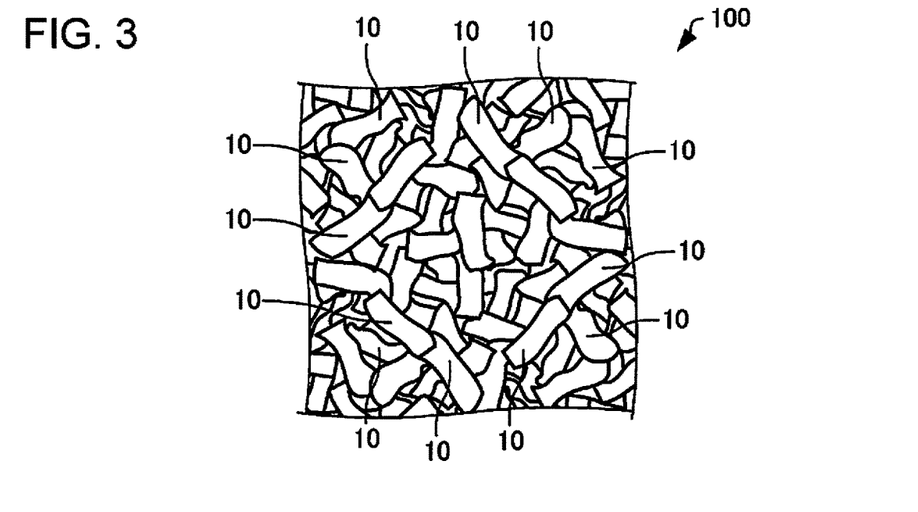
FIG. 3 is an illustrative representation of a liquid absorber according to an embodiment of the present disclosure.

FIG. 3 is an illustrative representation of a liquid absorber 100 according to an embodiment of the present disclosure. As depicted in FIG. 3, the liquid absorber 100 includes the small chips 10 described above. In other words, the liquid absorber 100 is a mass of the small chips 10. The number of chips 10 in the liquid absorber 100 may be, but is not limited to, 100 or more, for example, 200 or more or 500 or more.

In the liquid absorber 100, the chips 10 may be the same in terms of least one of the length, the width, the aspect ratio, and the thickness, or at least some of the chips 10 may be different in all of those measurements.

In some embodiments, the chips 10 of the liquid absorber 100 have a regular shape. Such a liquid absorber 100 is likely to have a constant bulk density, exhibiting uniform liquid absorption. The content of chips 10 having a regular shape in the liquid absorber 100 may be 30.0% or more, for example, 50.0% or more or 70.0% or more, relative to the total mass of the liquid absorber 100.

The chips 10 of the liquid absorber 100 may be randomly present intersecting each other in a three-dimensional manner without a regular orientation. Thus, gaps are likely to be formed among the chips 10. The gaps among the chips 10 allow the liquid to pass through. In addition, thin gaps cause a capillary action to ensure liquid permeation. For example, a liquid absorber 100 housed in a container allows a liquid to flow downward in the container without stopping the flow and penetrate through the liquid absorber to the bottom of the container.

In addition, since the small chips 10 are three-dimensionally randomly housed in a container, the opportunity of the liquid absorber 100 to come in contact with liquid increases as a whole, and, accordingly, the liquid absorber 100 can exhibit satisfactory liquid absorption. Also, the chips 10 can be randomly placed into a container when the liquid absorber 100 is housed in the container. The liquid absorber 100 thus allows easy and rapid work. The chips 10 are flexible. The liquid absorber 100 that is a mass of flexible chips 10 can be readily housed in a container, following the shape of the container, irrespective of the shape of the container.

The bulk density of the liquid absorber 100 may be 0.01 g/cm$^3$ to 0.5 g/cm$^3$, for example, 0.03 g/cm$^3$ to 0.3 g/cm$^3$ or 0.05 g/cm$^3$ to 0.2 g/cm$^3$. Such a liquid absorber 3 ensures both liquid absorption and liquid permeation.

The liquid absorber 100 may contain other constituents. Examples of such constituents include a surfactant, a lubricant, an antifoaming agent, a filler, an anti-blocking agent, a UV absorber, a coloring agent, such as a pigment or a dye, a flame retardant, and a fluidity improver.

The liquid absorber 100, in which the chips 10 have the above-described structure and effect, is highly absorbent even of a liquid having a high ion concentration. Accordingly, the liquid absorber 100 is particularly effective in absorbing liquid with a high ion concentration, such as a dye ink.

1.3. Manufacture of Liquid Absorber

A process for manufacturing the liquid absorber 100 according to an embodiment of the present disclosure will now be described with reference to some of the drawings. FIGS. 4 to 7 are illustrative representations of a process for forming small chips 10 of the liquid absorber 100. The chips 10 of the liquid absorber 100 may be formed as described below.

Figure 4:
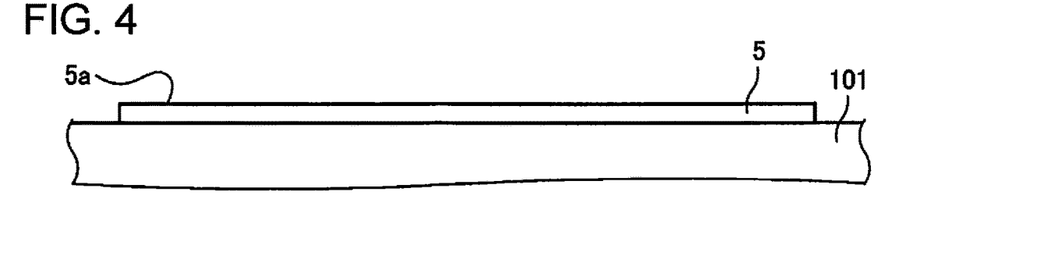
FIG. 4 is an illustrative representation of a process for forming small chips of a liquid absorber.

A sheet member 5 (for example, a recycled waste-paper sheet) that will act as the first substrate 1 and the second substrate 2 is placed on a table 101, as depicted in FIG. 4. Then, a liquid containing water, for example, pure water, is applied onto a surface of the sheet member 5 by spray coating or by rolling a spongy roller soaked with the liquid containing water over the surface of the sheet member.

Figure 5:
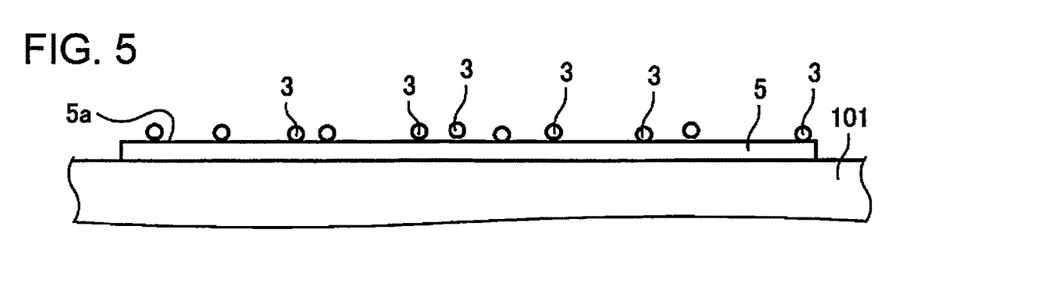
FIG. 5 is an illustrative representation of the process for forming small chips of a liquid absorber.

Then, as depicted in FIG. 5, an absorbent resin 3 is applied onto a surface 5a of the sheet member 5. This application can be performed by dispersing the absorbent resin 3 optionally through a mesh or the like.

Figure 6:
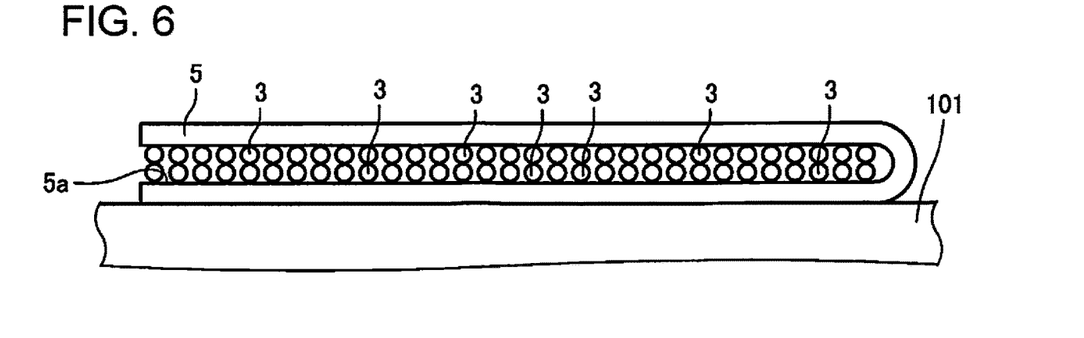
FIG. 6 is an illustrative representation of the process for forming small chips of a liquid absorber.

After the absorbent resin 3 is dispersed, the sheet member 5 on the table 101 is folded in two in such a manner that the surface 5a having the absorbent resin 3 thereon comes inside, as depicted in FIG. 6.

Figure 7:
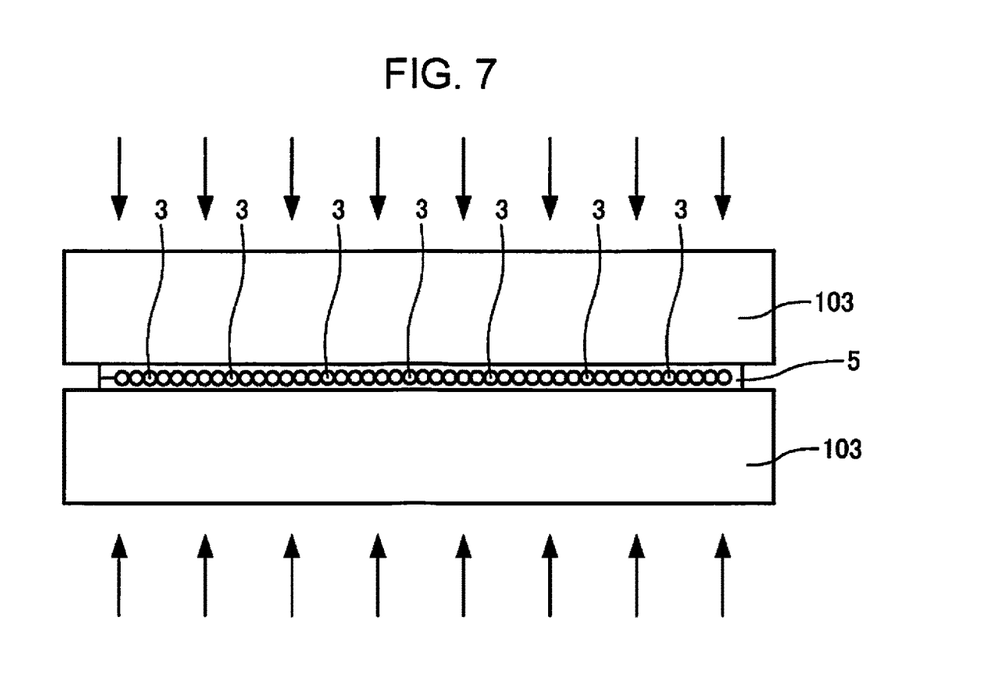
FIG. 7 is an illustrative representation of the process for forming small chips of a liquid absorber.

As depicted in FIG. 7, the folded sheet member 5 is disposed between a pair of heating blocks 103. While being heated, the heating blocks 103 are moved toward the sheet member 5 in the opposite directions to press the sheet member 5 in the thickness direction. Thus, the absorbent resin 3 is heated to soften, and the particles of the absorbent resin are embedded in the sheet member 5 by the pressing. Also, some particles of the softened absorbent resin 3 may join to other particles thereon between the opposing portions of the folded sheet member 5.

The pressure to press the sheet member 5 may be 0.1 kg/cm$^2$ to 1.0 kg/cm$^2$, for example, 0.2 kg/cm$^2$ to 0.8 kg/cm$^2$. The heating temperature in this operation may be 80.0° C. to 160.0° C., for example, 100.0° C. to 120.0° C.

When heat and pressure are removed, temperature decreases, and the embedded particles of the absorbent resin 3 are joined to the sheet member 5 and further join the opposing portions of the folded sheet member 5 together. In an embodiment, an adhesive may be used to enhance the adhesion between the opposing portions of the sheet member 5.

Then, the sheet member 5 is cut, ground, or tore into a plurality of small chips 10 with scissors, a cutter, a mill, a shredder, or the like or by hand. The opposing portions of the folded sheet member 5 act as the first substrate 1 and the second substrate 2 of the small chip 10. The resulting chips 10 define the liquid absorber 100. After a desired amount of the liquid absorber 100 is weighed out, the chips 10 may be disentangled by hand to adjust the bulk density or the shape of the liquid absorber 100.

An ion scavenger is added into the sheet member 5 by applying an aqueous solution or a water dispersion of the ion scavenger. For this operation, the solution or dispersion may be applied by spray coating, using a brush or a roller, an ink jet method, or the like. The addition of the ion scavenger may be performed either before or after the application of the absorbent resin 3 to the sheet member (or substrate). The ion scavenger can be added any timing provided that the substrate(s) contains the ion scavenger at the end of the process of producing the liquid absorber 100.

For spray coating, the solution or dispersion of the ion scavenger may be sprayed onto the sheet member 5 in advance or after heat pressing or may be sprayed onto the chips 10. For the application using a brush or a roller or an ink jet method, the solution or dispersion of the ion scavenger may be applied onto the sheet member 5 in advance or after heat pressing. In this instance, it is efficient to apply the solution or dispersion of the ion scavenger before forming the chips 10.

When the solution or dispersion of the ion scavenger is applied or sprayed onto the sheet member 5, either side or both sides of the sheet member 5 may be subjected to the application or spraying.

2. Liquid Absorbing Unit

Figure 8:
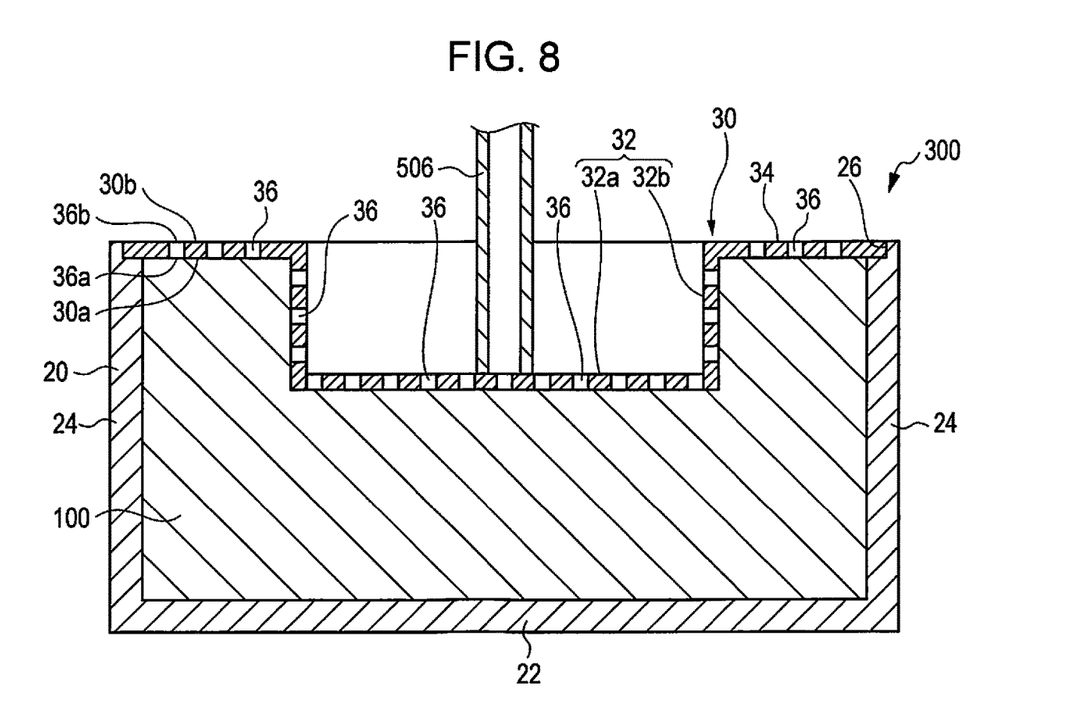
FIG. 8 is a schematic sectional view of a liquid absorbing unit according to an embodiment of the present disclosure.
Figure 9:
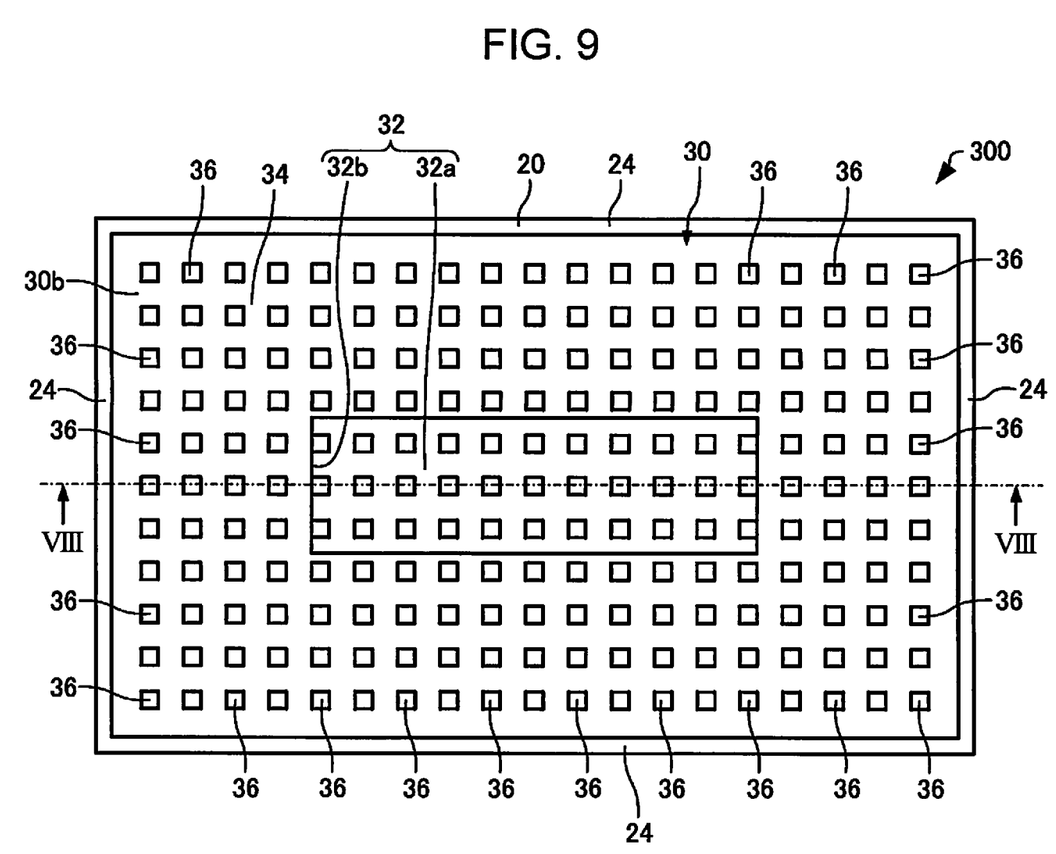
FIG. 9 is a schematic plan view of a liquid absorbing unit according to an embodiment of the present disclosure.

A liquid absorbing unit according to an embodiment of the present disclosure will now be described with reference to some of the drawings. FIG. 8 is a schematic sectional view of a liquid absorbing unit 300 according to an embodiment of the present disclosure. FIG. 9 is a schematic plan view of the liquid absorbing unit 300. FIG. 8 illustrates the section taken along line VIII-VIII in FIG. 9.

As depicted in FIGS. 8 and 9, the liquid absorbing unit 300 includes the liquid absorber 100, a case 20 or container, and a lid 30. In FIGS. 8 and 9, the liquid absorber 100 is simplified for the sake of convenience. Reference numeral 506 designates a tube, which is omitted in FIG. 9. The components of the liquid absorbing unit will now be described.

2.1. Case

The case 20 is a container in which the liquid absorber 100 is housed. As depicted in FIG. 8, the case 20 contains the liquid absorber 100. For example, the case 20 has a rectangular planar bottom 22 and four sidewalls 24 along each side of the bottom 22. The upper end of the case 20 is open. The shape of the bottom 22 is not necessarily rectangular and may be, for example, circular.

The ratio V2/V1 of the volume V2 of the liquid absorber 100 before absorbing a liquid to the capacity V1 of the case 20 may be from 0.1 to 0.7, for example, from 0.2 to 0.7.

In some embodiments, the case 20 can maintain the shape or dimensions to the extent that the capacity V1 does not 10% or more vary even if an inner pressure occurs or an external force is applied to the case 20. Such a case 20 maintains the shape thereof even if the case 20 undergoes a force from the liquid absorber 100 swollen by absorbing a liquid, such as ink. Thus, the case 20 is stable in an installed state, thus allowing the liquid absorber 100 to consistently absorb a liquid, such as an ink.

The case 20 is made of, for example, a resin such as cyclic polyolefin or polycarbonate or a metal such as aluminum or stainless steel.

2.2. Lid

The lid 30 closes the open end 26 of the case 20. The lid 30 covers the liquid absorber 100. The liquid absorber 100 lies between the lid 30 and the bottom 22 of the case 20. The lid 30 may have a thickness of 50 µm to 5 mm, for example, 100 µm to 3 mm. The lid 30 illustrated in FIG. 9 is rectangular but is not limited to such a shape.

The lid 30 has a recessed portion 32 depressed toward the liquid absorber 100 and an outer portion 34 surrounding the recessed portion 32 when viewed from above. The recessed portion 32 is formed at a position to which ink or any other liquid is discharged. For example, the recessed portion 32 may be formed in a region including the center of the lid 30 when viewed from above.

The recessed portion 32 has a bottom 32a and a sidewall 32b. In the illustrated embodiment, the bottom 32a is rectangular and planar. The sidewall 32b is formed along each side of the bottom 32a. The sidewall 32b surrounds at least a part of the region of the lid 30 to which ink is discharged. The sidewall 32b is joined to the bottom 32a. For discharging ink or any other liquid through the tube 506, the tube 506 is inserted into a space defined by the recessed portion 32, as depicted in FIG. 8. The recessed portion 32 prevents the discharged bubbly liquid from spilling out. The recessed portion 32 is particularly effective for liquids that contain a large amount of surfactant and are likely to bubble.

The outer portion 34 is the portion of the lid 30 other than the recessed portion 32. In the embodiment depicted in FIG. 9, the outer portion 34 surrounds the recessed portion 32 when viewed from above. The portion of the liquid absorber 100 between the outer portion 34 and the bottom 22 has a larger thickness than the portion of the liquid absorber 100 between the recessed portion 32 and the bottom 22.

The lid 30 is provided with through-holes 36 through which liquid passes. The through-holes 36 pass through the lid 30 in the thickness direction. The lid 30 has a surface 30a in contact with the liquid absorber 100 and a surface 30b opposite the surface 30a. The through-holes 36, which pass from the surface 30a to the surface 30b, define openings 36a at the surface 30a and openings 36b at the surface 30b. In the embodiment illustrated in FIG. 9, the openings 36a and 36b are the same in shape and size. The through-holes 36 are formed in a region of the lid 30 to which liquid is discharged.

The through-holes 36 are formed in the recessed portion 32. In the embodiment illustrated in the drawings, the through-holes 36 are formed in the bottom 32a and the sidewall 32b of the recessed portion 32 and, in addition, in the outer portion 34. The cross section of the through-holes 36 may be quadrilateral. In the illustrated embodiment, the cross section is square. The cross section of the through-holes 36 is not necessarily square and may be in any other shape, such as rectangular, triangular, pentagonal, hexagonal, further polygonal, circular, or oval, or in a star-like shape, such as hexagram.

The number of through-holes 36 is plural and is not particularly limited. In the embodiment illustrated in FIG. 9, the through-holes 36 are arranged in a matrix matter defined by alignments extending in a first direction and alignments extending in a second direction perpendicular to the first direction.

The lid 30 may be made of a resin, and examples of the resin include polypropylene (PP), polystyrene (PS), polyethylene (PE), polyurethane (PU), polyvinyl chloride (PVC), acrylonitrile butadiene styrene (ABS), polymethyl methacrylate (PMMA), acrylonitrile styrene (AS), modified polyphenylene ether (PPE), polycarbonate (PC), polyamide (PA), polybutylene terephthalate (PBT), polyethylene terephthalate (PET), polyphenylene sulfide (PPS), polysulfone (PSU), polyacetal (POM), nylon, polyether ether ketone (PEEK), tetrafluoroethylene-perfluoroalkyl vinyl ether copolymer (PFA), tetrafluoroethylene-ethylene copolymer (ETFE), and polytetrafluoroethylene (PTFE).

Alternatively, the lid 30 may be a mesh member made of stainless steel wires, iron wires, copper wires, or any other metal wires, or a metal member having punched holes. The surfaces 30a and 30b of the lid 30 and the inner walls of the through-holes 36 may be subjected to hydrophobic treatment. Ink is not likely to accumulate on such a lid 30.

The liquid absorbing unit 300 of the illustrated embodiment contains the above-described liquid absorber 100 in the case 20 (container) and, therefore, can exhibit high absorption even of a liquid having a high ion concentration. Accordingly, the liquid absorbing unit 300 is particularly effective in absorbing liquid with a high ion concentration, such as a dye ink.

3. Liquid Ejection Apparatus

Figure 10:
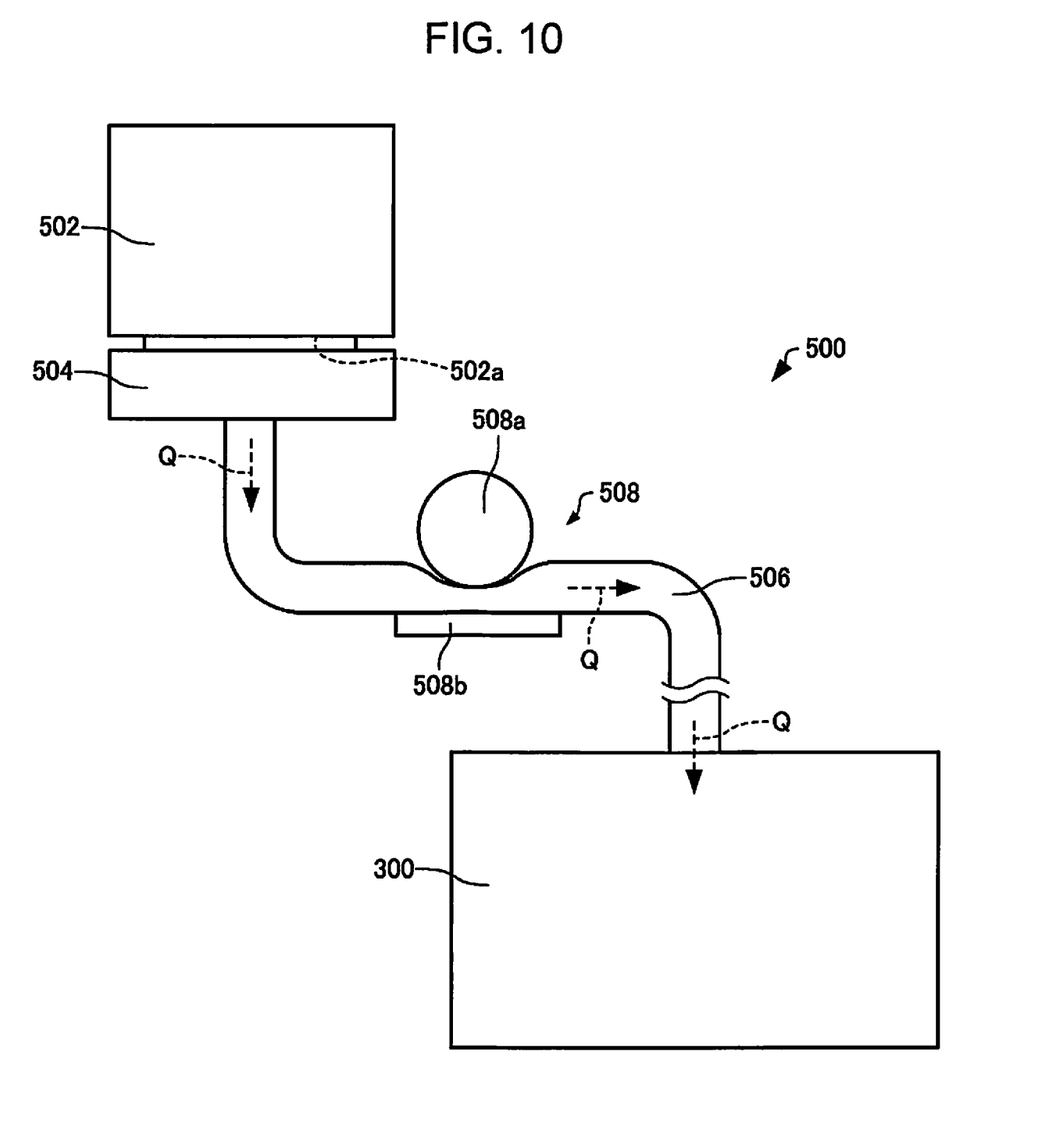
FIG. 10 is a schematic block diagram of a liquid ejection apparatus according to an embodiment of the present disclosure.

A liquid ejection apparatus according to an embodiment of the present disclosure will now be described with reference to a drawing. FIG. 10 is a schematic view of a liquid ejection apparatus 500 according to an embodiment of the present disclosure.

As depicted in FIG. 10, the liquid ejection apparatus 500 includes a liquid ejection head 502 operable to eject a liquid, such as an ink Q, a capping unit 504 to prevent the nozzles 502a of the liquid ejection head 502 from being clogged, a tube 506 connecting the capping unit 504 to a liquid absorbing unit 300, a roller pump 508 operable to pump the ink Q from the capping unit 504, and the liquid absorbing unit 300 operable to collect waste ink Q.

The liquid ejection head 502 has a plurality of nozzles 502a through which the ink Q is ejected downward. The liquid ejection head 502 is operable to print in such a manner as to eject an ink Q onto a printing medium (not shown), such as a PPC (plain paper copier) sheet, while moving across the printing medium.

The capping unit 504 is operable to suck the ink from the nozzles 502a at one time by an operation of the roller pump 508 when the liquid ejection head 502 is at a standby position, thus preventing the nozzles 502a from being clogged.

The tube 506 allows the ink Q sucked by the capping unit 504 to flow to the liquid absorbing unit 300. The tube 506 may be flexible.

The roller pump 508 is disposed at a point along the tube 506. The roller pump 508 includes a roller section 508a and a pinching section 508b that pinches the tube 506 with the cooperation of the roller section 508a. Rotation of the roller section 508a causes the capping unit 504 to suck the ink Q through the tube 506. The ink Q adherent to the nozzles 502a is removed and delivered to the liquid absorbing unit 300 by continuous rotation of the roller section 508a. The ink Q delivered to the liquid absorbing unit 300 is absorbed as waste ink.

The liquid absorbing unit 300 is removably mounted in the liquid ejection apparatus 500. The liquid absorbing unit 300 in the liquid ejection apparatus 500 absorbs the ink Q ejected from the liquid ejection head 502. The liquid absorbing unit 300 is what is called a waste tank. The liquid absorbing unit 300 is replaceable and can be changed to a new one when the absorption of the ink Q reaches the limit.

Whether or not the absorption of ink Q by the liquid absorbing unit 300 reaches the limit can be determined by using a detector (not shown) of the liquid ejection apparatus 500. When the absorption by the liquid absorbing unit 300 reaches the limit, a notification device such as a monitor, built in the liquid ejection apparatus 500 may notify the user of reaching the absorption limit.

The liquid ejection apparatus 500 of the illustrated embodiment includes the liquid absorbing unit 300 and, therefore, can exhibit a high absorption even of a liquid having a high ion concentration. Accordingly, the liquid ejection apparatus 500 is particularly effective in applications using a liquid with a high ion concentration, such as a dye ink.

4. Examples and Comparative Examples

The subject matter of the present disclosure will now be described in detail with reference to Examples. However, the implementation of the subject matter is not limited to the disclosed Examples. In the following description, "part(s)" and "%" are on a mass basis unless otherwise specified.

4.1. Materials of Liquid Absorber

The following materials were used in the Examples and Comparative Examples.

PPC G80 (basis weight: about 4.0 g/sheet), manufactured by Toppan Forms, used as the sheet member for the substrates SANFRESH ST-500MPSA (ion-dissociable absorbent resin having a carboxy group on a side chain), a product of Sanyo Chemical Industries, used as the absorbent resin.

Ion Scavengers

Nonionic polymer (represented as Polymer in Table 1)
   PITZCOLs, products of DKS (individual product names are presented in Table 1)
   RAM Resin, a product of Osaka Organic Chemical Industry (the product name is presented in Table 1)
   KURARAY POVALs, products of Kuraray (individual product names are presented in the Tables)
   DENKA POVALs, products of Denka (individual product names are presented in the corresponding table)
   GOHSENOLs, products of Mitsubishi Chemical (individual product names are presented in the corresponding table)
   Silanol-Modified POVAL, a product of Kuraray (product names are presented in the corresponding table)

Cation Exchange Resins
   IXE-100, a product of Toagosei
   IXE-500, a product of Toagosei Anion Exchange Resins
   Amberlite IRA 400J, a product available from Organo
   DIAION SA 10A, a product of Mitsubishi Chemical Additive: Meikanate CX, blocked polyisocyanate produced by Meisei Chemical Works FLOPAM EM140CT, a cationic polymer produced by SNF Tables 1 to 4 present the constituents and evaluation results of the liquid absorbers of Examples and Comparative Examples. Table 1 is for Examples using polyvinylpyrrolidone or a betaine polymer as a nonionic polymer and the Comparative Examples using a cationic polymer. Table 1 also presents the weight average molecular weight of those polymers. Table 2 is for the Examples using a polyvinyl alcohol as a nonionic polymer and presents the viscosity (of 4.0% by mass solution at 20° C.) and the saponification degree of the polymers. Table 3 is for the Examples using a silanol-modified polyvinyl alcohol as a nonionic polymer or using a polyvinyl alcohol and an additive (blocked isocyanate) in combination and presents the saponification degree before crosslinking of the polymer and the proportion of the additive. Table 4 is for the Examples using an ion exchange resin and presents the type of the ion exchange resin used. All the Tables present the amount of the absorbent resin and the name and amount of the ion scavenger.

TABLE 1

|  | Amount of absorbent resin (g/sheet) | Ion scavenger | Weight average molecular weight of polymer | Amount (parts) of ion scavenger | Absorbent resin retention | Lay-down test 30 min | Lay-down test 24 h |
| --- | --- | --- | --- | --- | --- | --- | --- |
| Example 1 | 4.00 | PITZCOL K-17L | 9000 | 0.5 | 1 | 4 | 4 |
| Example 2 |  |  |  | 5.0 | 1 | 3 | 4 |
| Example 3 |  |  |  | 30.0 | 1 | 2 | 4 |
| Example 4 |  | PITZCOL K-30 | 45000 | 0.5 | 1 | 3 | 4 |
| Example 5 |  |  |  | 5.0 | 1 | 2 | 3 |
| Example 6 |  |  |  | 30.0 | 1 | 2 | 3 |
| Example 7 |  | PITZCOL K-50 | 250000 | 0.5 | 1 | 1 | 2 |
| Example 8 |  |  |  | 5.0 | 1 | 1 | 2 |
| Example 9 |  |  |  | 30.0 | 1 | 1 | 2 |
| Example 10 |  | PITZCOL K-90 | 1200000 | 0.5 | 1 | 1 | 1 |
| Example 11 |  |  |  | 5.0 | 1 | 1 | 1 |
| Example 12 |  |  |  | 30.0 | 1 | 1 | 1 |
| Example 13 |  | PITZCOL K-120L | 2800000 | 0.5 | 1 | 1 | 1 |
| Example 14 |  |  |  | 5.0 | 1 | 1 | 1 |
| Example 15 |  |  |  | 30.0 | 1 | 2 | 1 |
| Example 16 | 0.50 | PITZCOL K-90 | 1200000 | 5.0 | 1 | 3 | 3 |
| Example 17 | 1.00 |  |  |  | 1 | 2 | 2 |
| Example 18 | 2.00 |  |  |  | 1 | 2 | 1 |
| Example 19 | 6.00 |  |  |  | 3 | 2 | 1 |
| Example 20 | 8.00 |  |  |  | 4 | 2 | 1 |
| Example 21 | 4.00 | RAM Resin 2000 | 80000 | 0.5 | 1 | 2 | 3 |
| Example 22 |  |  |  | 5.0 | 1 | 1 | 2 |
| Example 23 |  |  |  | 30.0 | 2 | 2 | 2 |
| Comparative Example 1 | 4.00 | — | — | — | 1 | 5 | 5 |
| Comparative Example 2 |  | FLOPAM EM140CT | 750000 | 0.5 | 1 | 5 | 5 |
| Comparative Example 3 |  |  |  | 5.0 | 1 | 5 | 5 |
| Comparative Example 4 |  |  |  | 30.0 | 1 | 5 | 5 |

TABLE 2

|  | Amount of absorbent resin (g/sheet) | Ion scavenger | Viscosity (mPa·s) | Saponification degree (%) | Amount (parts) of ion scavenger | Absorbent resin retention | Lay-down test 30 min | Lay-down test 24 h |
| --- | --- | --- | --- | --- | --- | --- | --- | --- |
| Example 24 | 4.00 | KURARAY POVAL 3-80 | 2.8 to 3.3 | 78.5 to 81.5 | 5.0 | 1 | 4 | 4 |
| Example 25 |  | KURARAY POVAL 3-88 | 3.2 to 3.6 | 87.0 to 89.0 |  | 1 | 4 | 4 |
| Example 26 |  | KURARAY POVAL LM-10HD | 4.5 to 5.7 | 38.0 to 42.0 |  | 1 | 3 | 2 |
| Example 27 |  | DENKA POVAL B-05 | 5.0 to 6.0 | 86.5 to 89.5 |  | 1 | 2 | 3 |
| Example 28 |  | DENKA POVAL K-05 | 5.2 to 6.6 | 98.0 to 99.0 |  | 1 | 3 | 3 |
| Example 29 |  | GOHSENOL KH-20 | 44.0 to 52.0 | 78.5 to 81.5 | 0.1 | 1 | 3 | 4 |
| Example 30 |  |  |  |  | 0.5 | 1 | 2 | 2 |
| Example 31 |  |  |  |  | 5.0 | 1 | 1 | 1 |
| Example 32 |  |  |  |  | 10.0 | 1 | 1 | 1 |
| Example 33 |  |  |  |  | 15.0 | 2 | 1 | 1 |
| Example 34 |  | GOHSENOL GH-23 | 48.0 to 56.0 | 86.5 to 89.0 | 5.0 | 1 | 1 | 1 |
| Example 35 |  | KURARAY POVAL 60-98 | 54.0 to 66.0 | 98.0 to 99.0 |  | 1 | 2 | 3 |
| Example 36 |  | DENKA POVAL B-33 | 98.0 to 122 | 87.0 to 89.0 |  | 2 | 1 | 1 |
| Example 37 |  | GOHSENOL KH-20 | 44.0 to 52.0 | 78.5 to 81.5 |  | 1 | 1 | 3 |
| Example 38 |  |  |  |  |  | 1 | 1 | 1 |
| Example 39 | 1.00 |  |  |  |  | 2 | 1 | 1 |
| Example 40 | 2.00 |  |  |  |  | 3 | 1 | 1 |
| Example 41 | 8.00 |  |  |  |  | 4 | 1 | 1 |

TABLE 3

| | Amount of absorbent resin (g/sheet) | Ion scavenger | Viscosity (mPa·s) | Saponification degree (%) | Amount (parts) of ion scavenger | Amount (parts by mass) of additive | Absorbent resin retention | Lay-down test 30 min | 24 h |
|---|---|---|---|---|---|---|---|---|---|
| Example 42 | 4.00 | Kuraray | 4.0 to 6.0 | 98.0 to 99.0 | 0.10 | — | 1 | 3 | 3 |
| Example 43 | | Silanol- | | | 0.25 | | 1 | 1 | 1 |
| Example 44 | | Modified | | | 5.00 | | 1 | 1 | 1 |
| Example 45 | | POVAL | | | 20.0 | | 1 | 1 | 1 |
| Example 46 | | R-2105 | | | 30.00 | | 3 | 1 | 1 |
| Example 47 | 4.00 | DENKA | 5.2 to 6.6 | | 0.10 | 10.0 | 1 | 3 | 3 |
| Example 48 | | POVAL | | | | 20.0 | 1 | 2 | 3 |
| Example 49 | | K-05 | | | | 50.0 | 1 | 2 | 3 |
| Example 50 | | | | | 0.50 | 10.0 | 1 | 1 | 2 |
| Example 51 | | | | | | 20.0 | 1 | 1 | 1 |
| Example 52 | | | | | 5.00 | 50.0 | 1 | 2 | 1 |
| Example 53 | | | | | | 10.0 | 1 | 1 | 1 |
| Example 54 | | | | | | 20.0 | 1 | 1 | 1 |
| Example 55 | | | | | 10.00 | 50.0 | 2 | 2 | 1 |
| Example 56 | | | | | | 10.0 | 1 | 1 | 1 |
| Example 57 | | | | | | 20.0 | 1 | 1 | 1 |
| Example 58 | | | | | 15.00 | 50.0 | 2 | 1 | 1 |
| Example 59 | | KURARAY | 4.5 to 5.7 | 38.0 to 42.0 | | 10.0 | 1 | 1 | 1 |
| Example 60 | | POVAL | | | | 20.0 | 2 | 1 | 2 |
| Example 61 | | LM-10HD | | | 0.50 | 50.0 | 4 | 2 | 3 |
| Example 62 | | | | | | 10.0 | 1 | 3 | 4 |
| Example 63 | | | | | | 20.0 | 1 | 4 | 4 |
| Example 64 | | | | | 5.00 | 50.0 | 1 | 4 | 4 |
| Example 65 | | | | | | 10.0 | 1 | 2 | 2 |
| Example 66 | | | | | | 20.0 | 1 | 2 | 2 |
| Example 67 | | | | | | 50.0 | 1 | 3 | 3 |

TABLE 4

| | Amount of absorbent resin (g/sheet) | Ion scavenger | Type | Amount (parts) of ion scavenger | Absorbent resin retention | Lay-down test 30 min | 24 h |
|---|---|---|---|---|---|---|---|
| Example 68 | 4.00 | IXE-100 | Cation | 0.1 | 1 | 4 | 4 |
| Example 69 | | | exchange | 0.5 | 1 | 4 | 4 |
| Example 70 | | | resin | 5.0 | 2 | 4 | 3 |
| Example 71 | | IXE-500 | Anion | 0.1 | 1 | 4 | 3 |
| Example 72 | | | exchange | 0.5 | 1 | 2 | 2 |
| Example 73 | | | resin | 5.0 | 2 | 1 | 1 |
| Example 74 | | AMBERLITE | Anion | 0.1 | 1 | 4 | 4 |
| Example 75 | | IRA 400J | exchange | 0.5 | 1 | 3 | 3 |
| Example 76 | | | resin | 5.0 | 2 | 2 | 2 |
| Example 77 | | DIAION | Anion | 0.1 | 1 | 4 | 3 |
| Example 78 | | SA 10A | exchange | 0.5 | 1 | 3 | 2 |
| Example 79 | | | resin | 5.0 | 2 | 1 | 1 |

4.2. Preparation of Liquid Absorbers

In the Examples and Comparative Examples, an amount of powder of each absorbent resin was prepared corresponding to the amount (g/sheet) of the absorbent resin presented in Tables 1 to 4. For example, 4.00 presented as an amount of an absorbent resin in a Table represents such an amount that 4.00 g of the absorbent resin will be supported for one PPC sheet member for forming chips.

Aqueous solutions or dispersions of the ion scavengers for the Examples in Tables 1 to 4 and aqueous solutions or dispersions of the additive Meikanate CX for Examples 47 to 67 were prepared so that the amount of the ion scavenger or the additive presented in Tables 1 to 4 could be applied relative to 100 parts by mass of the PPC sheet member. For Comparative Examples 2 to 4, aqueous solutions of a cationic polymer FLOPAM EM140CT were prepared so that the amount of the cationic polymer presented in Table 1 could be applied relative to 100 parts by mass of the PPC sheet member.

In each of the Examples and Comparative Examples, the solution or dispersion prepared above was applied over a surface of the A4-size PPC sheet for the substrates so that the amount (parts by mass) of the ion scavenger or additive presented in Tables 1 to 4 could be applied. Then, in each Example, the amount of absorbent resin presented in Tables 1 to 4 was uniformly dispersed over the surface of the PPC sheet member onto which the aqueous solution or dispersion was applied. The resulting sheet member was folded in two in such a manner that the surface having the absorbent resin thereon came inside. When the sheet was folded, it was visually ensured that the dispersed absorbent resin did not fall out of the sheet. In Comparative Example 1, water was applied to the sheet instead of a solution or dispersion of an ion scavenger.

The folded sheet was pinched between a pair of heating blocks of a press machine (manufactured by AS ONE Corporation) and subjected to heat press at a pressure of 0.3 kg/cm² and a temperature of 100° C. for 2 minutes. After the heat and pressure were removed, the sheet was allowed to stand at room temperature for 12 hours and then cut into 2 mm×15 mm rectangular small chips with a shredder (Securet F3143SP manufactured by Ishizawa Seisakusho). Thus, liquid absorbers were prepared for the Examples and Comparative Examples.

4.3. Evaluation of Liquid Absorbers

The chips (liquid absorber) prepared in each of the Examples and Comparative Examples in an amount equivalent to the entire sheet member were placed in a 200 mL New Disposable Cup manufactured by AS ONE Corporation. Thus, liquid absorbing units of the Examples and Comparative Examples were prepared.

4.3.1. Supportability (Retention) of Absorbent Resin

In each of the Examples and Comparative Examples, the amount of powder of the absorbent resin that had fallen on the bottom of the liquid absorbing unit was visually observed, and the amount of fallen absorbent resin was evaluated according to the following criteria. The results are presented in the Tables.

1: Absorbent resin was reliably retained without falling.
2: A small amount of absorbent resin fell without being retained.
3: About 25% of absorbent resin fell without being retained.
4: About 50% of absorbent resin fell without being retained.

4.3.2. Dye Ink Absorbency

The dye ink absorbency of the liquid absorbers of the Examples and Comparative Examples was measured by a lay-down test as described below. A dye ink was prepared for the test by mixing the black ink (HSM-BK), the cyan ink (HSM-C), the magenta ink (HSM-M), and the yellow ink (HSM-Y) of Seiko Epson HSM Dye Ink Set in a proportion by volume of Bk:C:M:Y=3:1:1:1.

The chips (liquid absorber) prepared in each of the Examples and Comparative Examples in an amount equivalent to the entire sheet member were placed in a 200 mL New Disposable Cup manufactured by AS ONE Corporation. Thus, liquid absorbing units of the Examples and Comparative Examples were prepared.

In each of the Examples and Comparative Examples, 25 mL of the dye ink was introduced into the liquid absorbing unit, and the liquid absorbing unit was allowed to stand at 26° C.±1° C. for 30 minutes and 24 hours. After such a time had passed, the liquid absorbing unit was immediately laid down (90° turned) for checking the state of spilled dye ink, and the amount of ink remaining in the container was rated on a 5-point scale according to the following criteria. The results are presented in the Tables.

1: No unabsorbed dye ink was observed even though the unit was laid down.
2: A small amount of unabsorbed dye ink was observed after the unit was laid down.
3: It was estimated by the lay-down test that about 25% of dye ink was not absorbed.
4: It was estimated by the lay-down test that about 50% of dye ink was not absorbed.
5: It was estimated by the lay-down test that more than 50% of dye ink was not absorbed.

4.4. Evaluation Results

Tables 1 to 4 suggest that the liquid absorbers of the Examples exhibited satisfactory absorption of the dye ink. The liquid absorbers of the Examples include a plurality of small chips, and the individual chips include a first substrate containing fibers and an ion scavenger, a second substrate containing fibers, and an absorbent resin between the first substrate and the second substrate. On the other hand, the liquid absorber of Comparative Example 1 to which no ion scavenger was applied and the liquid absorbers of Comparative Examples 2 to 4 using a cationic polymer (not as ion scavenger) exhibited insufficient absorption of the dye ink.

More specifically, in the Examples (presented in Table 1) using polyvinylpyrrolidone-based ion scavengers, the larger the molecular weight of the ion scavenger, the higher the absorbency. In the Examples (presented in Table 2) using polyvinyl alcohol-based ion scavengers, use of an ion scavenger having a saponification degree of 86.5% to 99.0% and whose 4.0% by mass aqueous solution has a viscosity of 48.0 mPa·s to 122.0 mPa·s at 20° C. tended to lead to satisfactory absorbency.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. A liquid absorber comprising a plurality of small chips, individual ones of the small chips including:
    a first substrate containing fibers;
    a second substrate containing fibers; and
    an absorbent resin supported between the first substrate and the second substrate,
    the first substrate further containing an ion scavenger selected from the group consisting of polyvinylpyrrolidone, polyvinyl alcohols, and polyethylene glycols.

2. The liquid absorber according to claim 1, wherein
    the content of the ion scavenger in the first substrate is 0.25 part to 30.0 parts by mass relative to 100.0 parts by mass of the first substrate.

3. The liquid absorber according to claim 1, wherein
    the ion scavenger is the polyvinylpyrrolidone having a weight average molecular weight of 9000 to 2800000.

4. The liquid absorber according to claim 1, wherein
    the ion scavenger is the polyvinyl alcohol having a saponification degree of 38.0% to 99.0%, and a solution of 4.0% by mass of the polyvinyl alcohol in water has a viscosity of 4.5 mPa·s to 122.0 mPa·s at 20° C.

5. The liquid absorber according to claim 1, wherein
    the ion scavenger is a modified polyvinyl alcohol, and the content of the modified polyvinyl alcohol in the first substrate is 0.25 part to 20.0 parts by mass relative to 100.0 parts by mass of the first substrate.

6. The liquid absorber according to claim 1, wherein the ion scavenger is chemically bound to the fibers with a crosslinking agent.

7. A liquid absorbing unit comprising:
the liquid absorber as set forth in claim 1; and
a container containing the liquid absorber.

8. A liquid ejection apparatus comprising:
a liquid ejection head operable to eject a liquid; and
the liquid absorbing unit as set forth in claim 7, the liquid absorbing unit being operable to absorb the liquid.

* * * * *